United States Patent [19]
Walsh

[11] Patent Number: 5,365,509
[45] Date of Patent: Nov. 15, 1994

[54] METHOD AND APPARATUS FOR ANALYZING NODES ON A COMPUTER NETWORK

[75] Inventor: Peter J. Walsh, Colorado Springs, Colo.

[73] Assignee: Hewlett-Packard Company, Palo Alto, Calif.

[21] Appl. No.: 978,052

[22] Filed: Nov. 18, 1992

Related U.S. Application Data

[63] Continuation-in-part of Ser. No. 578,989, Sep. 4, 1990, abandoned.

[51] Int. Cl.$^5$ .............................................. H04J 1/16
[52] U.S. Cl. ..................................... 370/13; 370/85.3
[58] Field of Search ................... 370/85.2, 85.3, 85.4, 370/17, 13, 121, 85.6; 340/825.5, 825.51; 371/5, 5.1, 5.2, 5.5, 27, 28, 31, 37.9; 375/36

[56] References Cited

U.S. PATENT DOCUMENTS

| | | | |
|---|---|---|---|
| 4,649,548 | 3/1987 | Crane | 375/36 |
| 4,701,909 | 10/1987 | Kavehrad et al. | 340/825.5 |
| 4,799,211 | 1/1989 | Felker et al. | 370/17 |
| 4,885,743 | 12/1989 | Helbers et al. | 370/85.2 |
| 4,890,278 | 12/1989 | Felker et al. | 370/17 |
| 4,896,315 | 1/1990 | Felker et al. | 370/17 |
| 4,905,302 | 2/1990 | Childress et al. | 340/825.5 |
| 4,970,720 | 11/1990 | Esaki | 370/85.2 |
| 5,048,009 | 9/1991 | Conrad | 370/17 |
| 5,101,401 | 3/1992 | Suzuki et al. | 370/13 |
| 5,101,402 | 3/1992 | Chiu et al. | 370/13 |
| 5,198,805 | 3/1993 | Whiteside et al. | 370/17 |

Primary Examiner—Douglas W. Olms
Assistant Examiner—Dang Ton

[57] ABSTRACT

Disclosed is a system that monitors the signal strength of each transmission by a node on a LAN cable of a local area network and determines the location of the node sending the signal. This system has a monitor at each end of the LAN cable, with one of the monitors typically being located in a computer node attached to the cable. When an information frame is sent on the cable, each of the monitors records the signal strength of the frame preamble and the source address contained within the frame. The distance to the node from a first end of the cable is calculated based on the signal strengths. A LAN collision trap circuit transmits a pseudo frame signal, of maximum length, periodically and monitors any collision or jam signals that occur during the pseudo frame. If a collision or jam is detected, a collision/jam information bit and the signal strength and time of the collision or jam, relative to the beginning of the pseudo frame, is recorded in a FIFO. Software within the system reads this FIFO, and determines, based on the collision/jam information bit and time, if a valid early collision, an invalid late collision or a jam was detected. If a late collision or jam was detected, the software determines the defective node by comparing the signal strengths of the collision or jam signal to the strengths measured by the LAN level monitor and displays the address and location of the defective node that caused the late collision or invalid jam.

17 Claims, 14 Drawing Sheets

METHOD AND APPARATUS FOR ANALYZING NODES ON A COMPUTER NETWORK

CROSS REFERENCE TO RELATED APPLICATION(S)

This is a continuation-in-part of copending application Ser. No. 07/578,989 filed Sept. 4, 1990, now abandoned.

FIELD OF THE INVENTION

This invention relates to computer systems and more particularly to computer networks. Even more particularly, the invention relates to a method and apparatus for monitoring the location and operation of nodes on a computer network.

BACKGROUND OF THE INVENTION

Computer Networks, called Local Area Networks (LANs), are increasingly popular in any environment where more than one computer is being used. Within the IEEE 802.3 protocol (Ethernet), each segment of the LAN can be up to 185 or 500 meters long, depending upon the type of connecting cable that is used. Up to 30 or 100 nodes may be attached to a segment, depending upon the type of cable that is used. Because of this length and number of nodes, a single segment often includes an entire office, and sometimes an entire building with the cable running through cable raceways, between walls and between floors.

The IEEE 802.3 protocol is a carrier sense multiple access/collision detect (CSMA/CD) type of protocol which allows all nodes to timeshare the same cable. When a first node wants to send information to another node, the first node listens for a carrier (meaning that some other node is sending) and if no carrier is sensed, the first node begins to transmit. If two nodes begin transmission at the same time, a collision will occur and both nodes will detect the collision and stop sending. Each node will try again later. Thus all nodes use the same cable without interfering with each other.

If a node is defective it may start sending without first listening for a carrier, which will frequently cause a collision. A defective node may incorrectly detect a carrier, or detect the carrier later than it should, causing a late collision. If a node is misadjusted, it may fail to detect a carrier that is transmitted near the lower limit or upper limit of allowed current.

Each information frame sent on the cable is limited in length, and a defective node may send a frame that is too long. When a frame is too long, any other node on the network may jam the node sending the long frame. If a node is misadjusted, it may send an early jam signal causing a jam of a valid frame.

Many other problems can, and often do, occur on a segment. When a problem occurs, a system administrator needs to know which node is causing the problem. Since all nodes use the same cable, and since this cable may extend for up to 500 meters through walls, cable conduits, and building floors, the administrator has a difficult task in finding the defective node.

There is a need in the art for a system to locate nodes on a network segment. There is a further need for such a system that will detect nodes that cause late collisions. A still further need is for such a system that detects nodes that cause early jamming. Yet another need is for a system to detect nodes that fail to detect carrier levels near the allowable limits. The present invention meets these needs.

SUMMARY OF THE INVENTION

It is an aspect of the present invention to monitor signals on a segment of an IEEE 802.3 computer local area network.

Another aspect of the invention is to measure the signal strength of the signal transmitted by each node connected to the network segment.

Another aspect is to calculate the location of each node located on a segment of the network, based on the signal strength of the signal transmitted by each node.

Another aspect is to calculate the location of a node by measuring the signal strength from such node at two points on the network segment, calculate a ratio of the signal strength at the second point to the sum of the signal strengths at both points, giving the distance from the node to the first measurement point.

Another aspect is to display to a user or network manager of such network the location of any node.

Another aspect of the invention is to detect nodes that cause late collisions on the network.

A further aspect of the invention is to detect nodes that fail to recognize a carrier signal that is near the limits of allowable carrier transmission level.

A still further aspect is to detect nodes that send a jam signal before the end of a valid frame.

The above and other aspects of the invention are accomplished in a system that monitors the signal strength of each transmission on the LAN cable. This system has a monitor at each end of the LAN cable, with one of the monitors typically being located in a computer node attached to the cable. When an information frame is sent on the cable, each of the monitors records the relative signal strength of the frame and the source address contained within the frame. The ratio of each of the signal strengths to the total is then calculated and this ratio is used to determine the location of the node that sent the frame on the network.

Each LAN level monitor has a filter that filters the incoming signal, sends the filtered signal to a sample and hold circuit, which in turn sends the signal to an analog-to-digital converter. In parallel with these elements, a phase locked loop extracts the data and clock from the signal, and a source address stripper circuit removes the source address from the information frame. Once the source address has been removed, and the signal strength level converted to a digital value, the source address and signal level are stored in a first-in-first-out (FIFO) buffer.

The data from each of the FIFO's in each of the LAN level monitors is collected by software that correlates the two values of signal strength level by using the source address recorded in the FIFO. Once the signal strength level at the two ends of the cable has been determined, the location of the node can be determined.

A LAN collision trap circuit transmits a pseudo frame signal periodically and monitors any collision or jam signals that occur during the pseudo frame. If a collision or jam is detected, the signal strength and time of the collision or jam is recorded in a FIFO. Software within the system reads this FIFO, and determines, based on the time and an information bit, if the collision was a valid early collision, and invalid late collision or a jam. If a late collision or jam was detected, the software determines the defective node by comparing the signal strengths of the collision or jam signal to the strengths measured by the LAN level monitor and displays the address and location of the defective node that caused the collision or invalid jam.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

In general, the invention comprises a system that monitors the signal strength of each transmission on a LAN cable. The system has a level monitor at each end of the LAN cable, with one of the monitors typically being located in a computer node attached to the cable. When an information frame is sent on the cable, each of the monitors records the relative signal strength of the frame and the source address contained within the frame.

The system also has a LAN collision trap circuit that transmits a pseudo frame signal periodically and monitors any collision or jam signals that occur during the pseudo frame. If a collision or jam is detected, a bit indicating collision or jam plus the signal strength and time of the collision or jam, relative to the beginning of the pseudo-frame, is recorded in a FIFO. Software within the system reads this FIFO, and determines, based on the time, if a late collision or a jam was detected. If a late collision or jam was detected, the software determines the defective node by comparing the signal strengths of the collision or jam signal to the strengths measured by the LAN level monitors and displays the address and location of the defective node that caused the collision or invalid jam.

Figure 1:
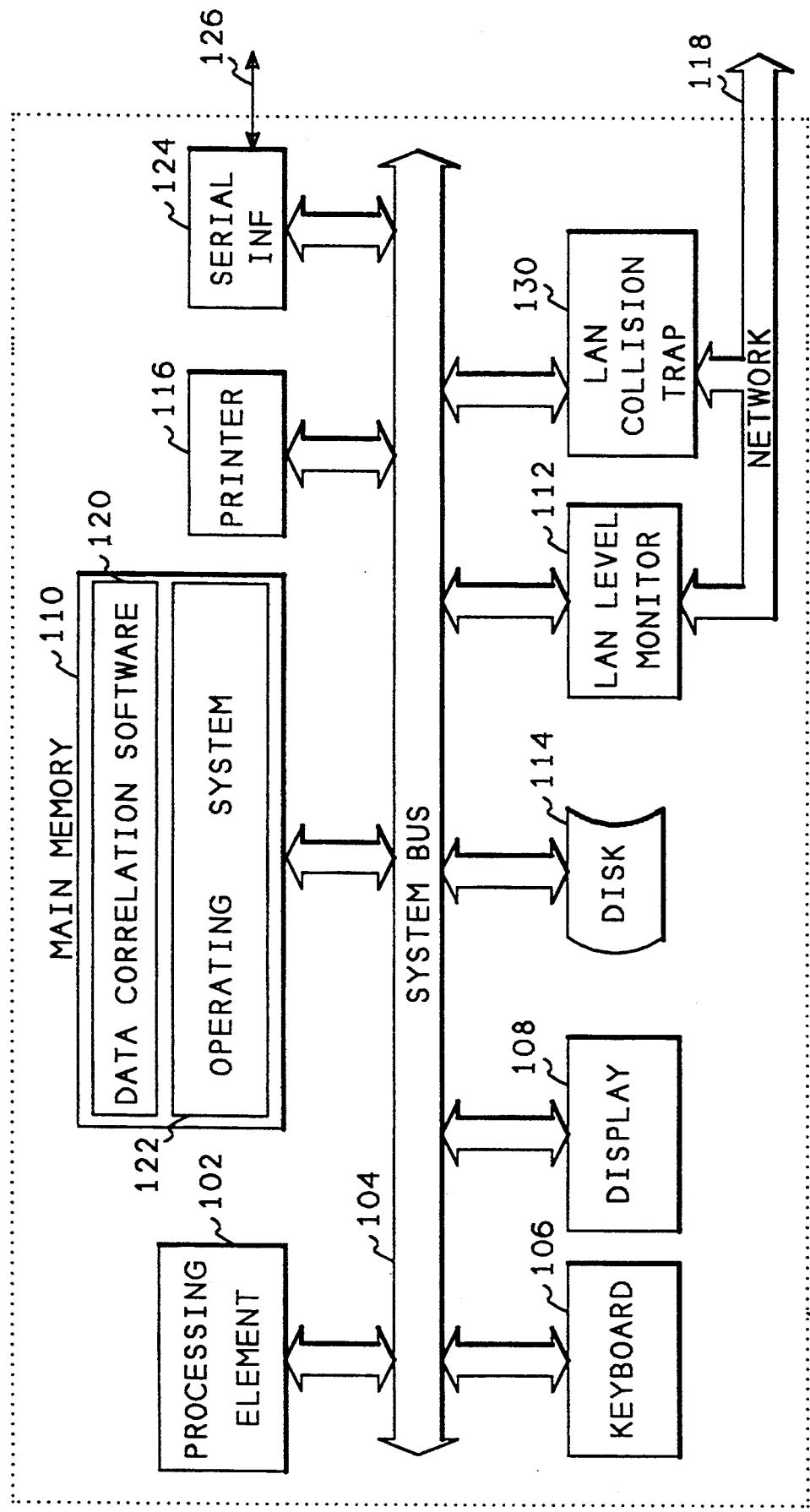
FIG. 1 shows a block diagram of a computer system incorporating the present invention.

FIG. 1 shows a block diagram of a computer system incorporating the present invention. Referring now to FIG. 1, a computer system 100 contains a processing element 102. The processing element 102 communicates to other components of the computer system 100 over a system bus 104. A keyboard 106 is used to accept textual information from a user of the system, typically the network administrator. A display 108 is used to output information to the network administrator, and may have the ability to output graphics information. A main memory 110 contains the data correlation software 120 which interfaces to the rest of the system through the operating system 122. The data correlation software 120, operating system 122, and the tables of information regarding the network are stored on a disk 114. A printer 116 is used to produce a hardcopy of the results of the data correlation software.

Network level monitor 112 collects and analyzes each information frame sent over the network 118, and thus is connected to one end of the network 118. A similar network monitor is connected to the other end of network 118 and it sends its data back to the computer system 100 via a serial interface 124 and a serial cable 126. LAN collision trap 130 produces a pseudo frame signal of maximum length that is transmitted on the network 118 and then the LAN collision trap 130 monitors the network 118 to determine whether any other nodes on the network are defective or maladjusted.

Figure 2:
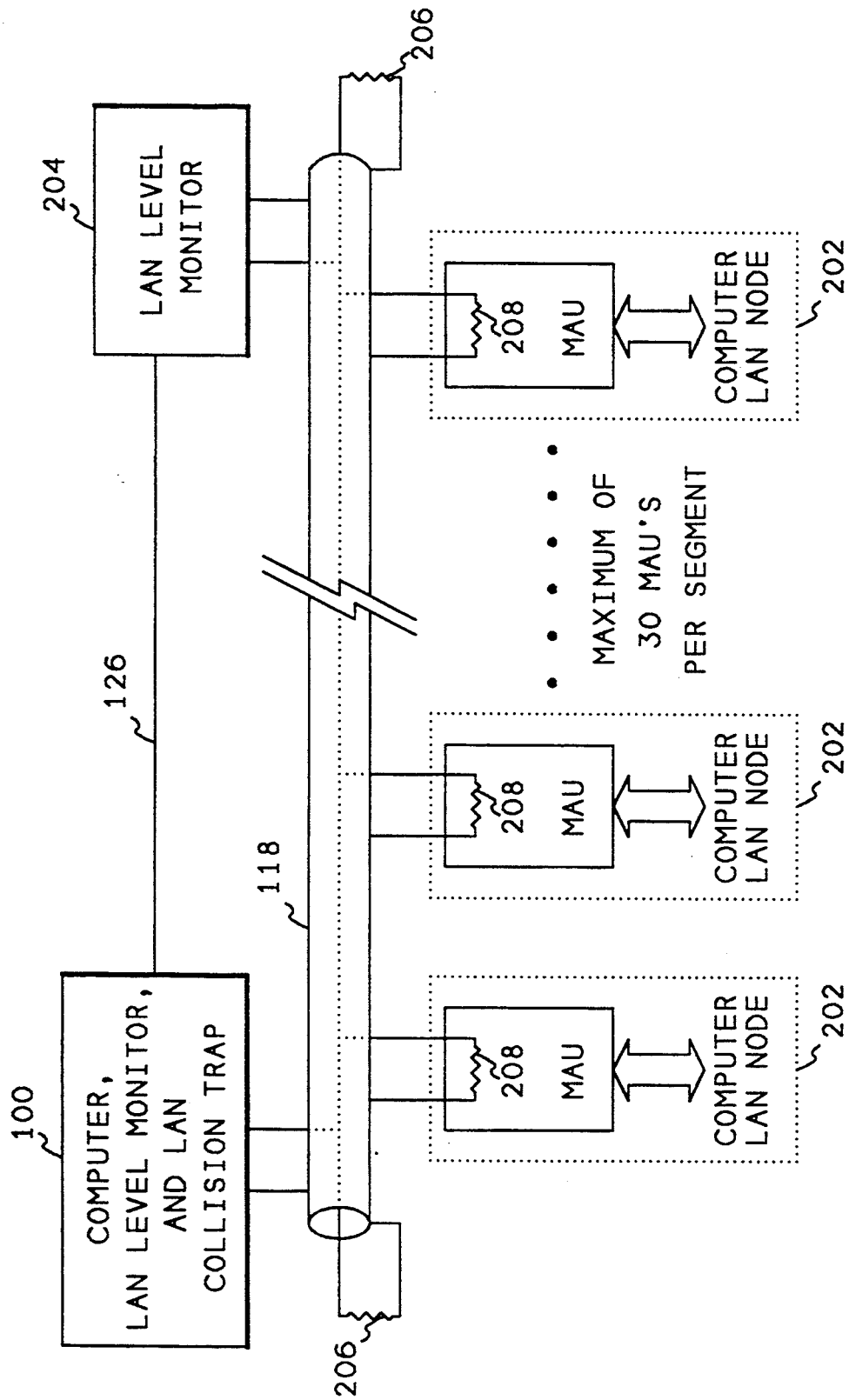
FIG. 2 shows a diagram of a computer network incorporating the invention.

FIG. 2 shows a diagram of a computer network incorporating the present invention. Referring now to FIG. 2, the computer system 100 is shown with the LAN level monitor 112 and the LAN collision monitor 130 contained inside. The local area network 118 extends from the computer 100 and connects to several LAN nodes 202. The LAN 118 has a second LAN level monitor 204 at its other end. The LAN level monitor 204 collects information and sends that information back to the computer system 100 over a serial interface 126.

It is important that the two LAN level monitors be located at each end of the LAN cable 118. If the LAN monitors exist at other locations, they will only accurately locate nodes that are located between the two LAN monitors, and will provide inaccurate locations for nodes existing outside the two LAN monitors.

The LAN 118 is comprised of a coaxial cable which is terminated at each end by resistors 206 each having a value of 50 ohms plus or minus 1 percent. The media access unit (MAU) of each node 202 terminates in a resistance 208 having a value of at least 7.5K ohms. Because of the high value of the resistances 208, they are not significant in the calculation of the minimum and maximum resistances seen on the local area network 118. The minimum resistance seen by a MAU between the center conductor and the shield of a LAN segment 118 is 24.775 ohms. This value is calculated from the fact that one meter of LAN cable (two nodes minimum) has a resistance of 50 milliohms, and the minimum termination resistance for resistors 206 is 49.5 ohms. The maximum resistance seen by a MAU is 27.75 ohms, where the segment is 185 meters in length, therefore having a resistance of 10 ohms, and the termination resistors 206 are at their maximum value of 50.5 ohms.

Figure 3:
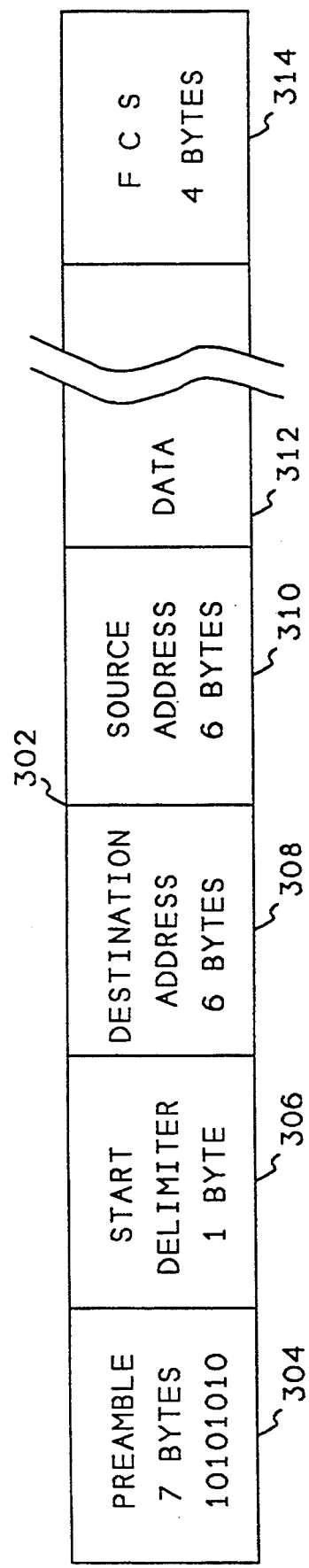
FIG. 3 shows a diagram of a prior art information frame for an IEEE 802.3 computer network.

FIG. 3 shows a diagram of a prior art information frame for the IEEE 802.3 computer network. Referring now to FIG. 3, an information frame 302 starts with a preamble 304. The preamble 304 has seven bytes of the bit pattern 10101010. Following the preamble 304 is a start delimiter which is one byte containing the binary pattern 10101011. Following the start delimiter 306 is the destination address 308, which is six bytes long. Following the destination address is the source address 310 which is also six bytes long. Next follows the data portion 312 of the frame, which can vary in length from 48 bytes to 1502 bytes. The last information in the frame is the frame check sequence which is four bytes of error correction code redundancy data.

Figure 4:
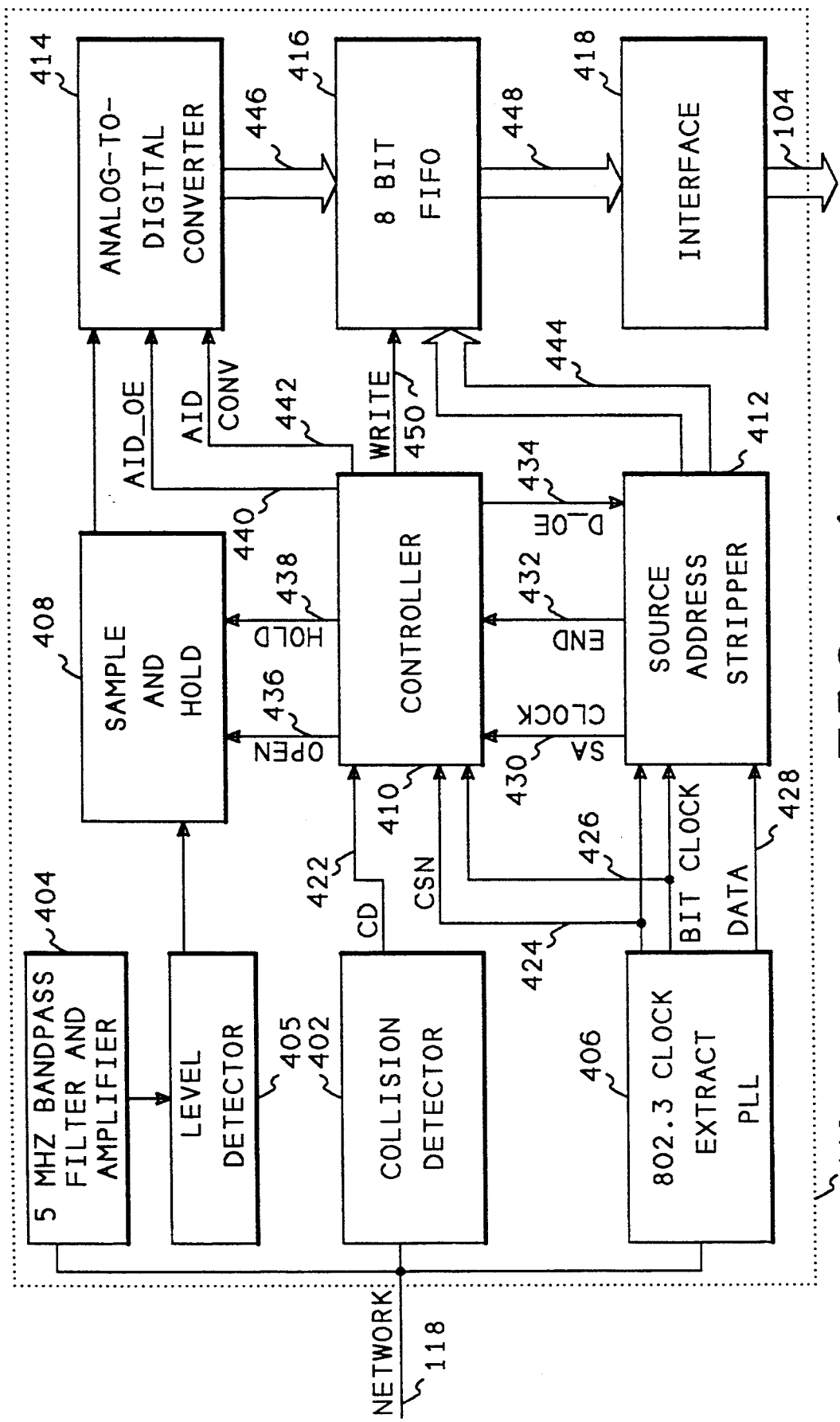
FIG. 4 shows a block diagram of the circuit of the LAN level monitor of the present invention.

FIG. 4 shows a block diagram of the LAN monitor circuit 112 of FIG. 1. Referring now to FIG. 4, the LAN monitor circuit 112 contains a collision detector 402 which receives the network 118. The collision detector 402 monitors the network 118 and whenever a collision occurs, the collision detector 402 sends a CD signal 422 to the controller 410. The maximum transmission rate of the network 118 is ten megabits per second, however, because of the data pattern contained in the preamble 304 (FIG. 3) the preamble frequency will be five megahertz. The five megahertz filter and amplifier circuit 404 receives the signal from the network 118, removes all harmonics and DC bias within the five megahertz preamble, and sends it to the level detector 405 which sends a level to the sample and hold circuit 408. The sample and hold circuit 408 receives the signal from the filter 404 and holds signal level until the analog-to-digital converter 414 can process the analog signal. The filter 404 also detects when information is being sent on the network 118 and outputs a carrier-sense signal 424 which goes to the controller 410 and the source address stripper circuit 412.

Also connected to the network 118, is the clock extract phase locked loop circuit 406. The circuit 406 extracts the serial data 428 from the information on the network 118 and also extracts a bit clock 426, which is used to synchronize the serial data 428. The serial data 428 goes to the source address stripper circuit 412 which monitors the data 428 and extracts the source address from that data. The source address stripper 412 sends a source address clock signal 430 which is a derived signal that clocks each byte of the source address. The source address stripper 412 also sends an end signal 432 after all bytes of the source address have been clocked by the source address clock 430.

A controller circuit 410 provides all the signals necessary to control the other circuits and collect data into the FIFO 416. The controller 410 sends an open signal 436 to the sample and hold circuit 408 after carrier is detected. The open signal 436 tells the sample and hold circuit 408 to start the sample period. After 32 clock bits, the controller 410 sends a hold signal 438 to tell the sample and hold circuit 408 to hold the analog level. The controller 410 sends a D_OE signal 434 to the source address stripper 412 to cause the source address stripper 412 to gate parallel data 444 into the FIFO 416. The controller 410 sends an A/D CONV signal 442 to the analog-to-digital converter circuit 414 to tell it to convert the analog signal into a digital value. When the controller 410 is ready to store the converted level value into the FIFO, it sends the A/D_OE signal 440 to the analog-to-digital converter circuit 414. After gating the appropriate data to the FIFO 416, controller 410 sends a write signal 450 to the FIFO 416.

After data has been stored in the FIFO 416, the computer system 100 can receive that data over the parallel bus 448 and the interface circuit 418.

Figure 5:
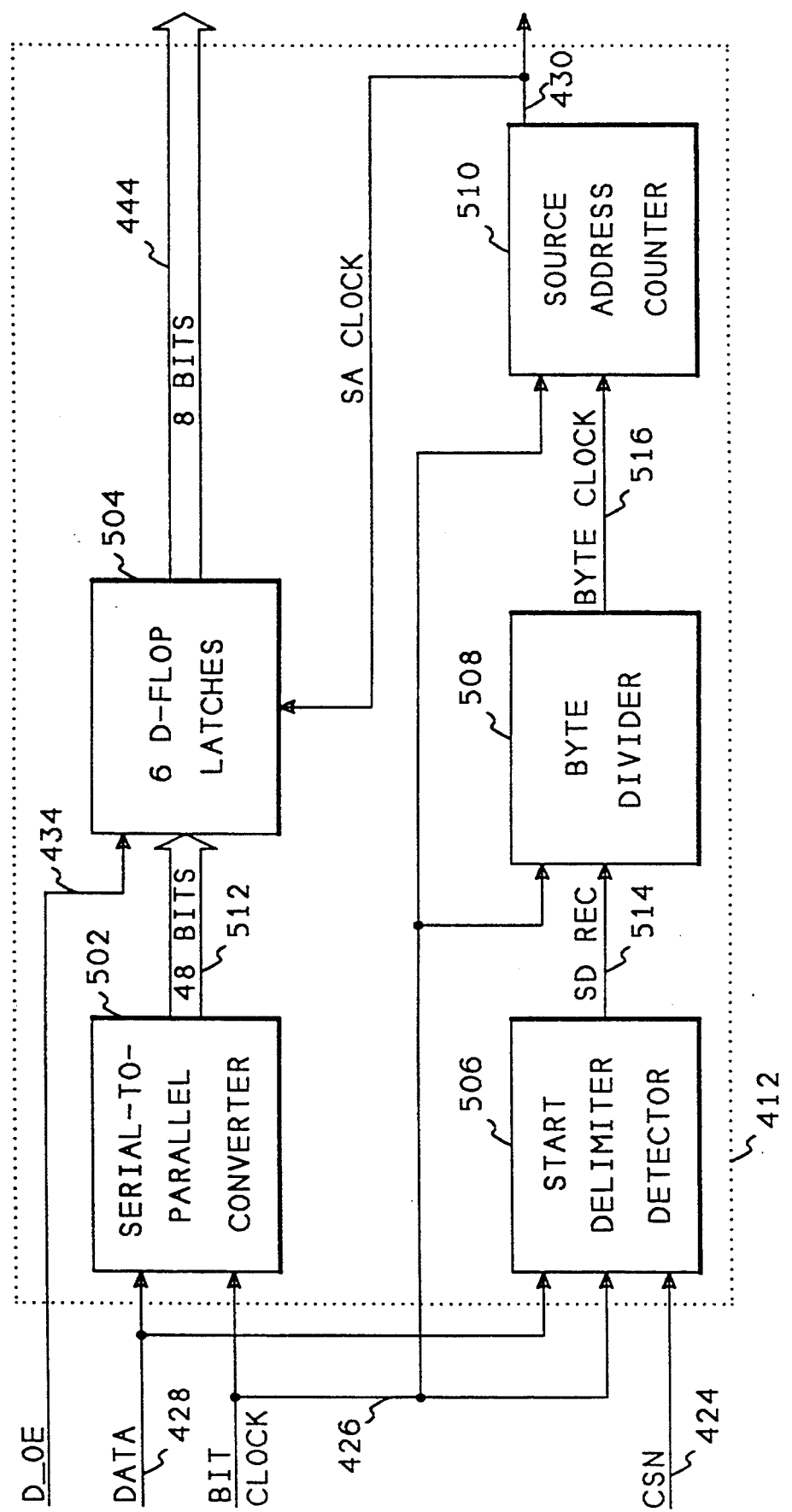
FIG. 5 shows a block diagram of the source address stripper circuit of FIG. 4.

FIG. 5 shows a block diagram of the source address stripper 412 of FIG. 4. Referring now to FIG. 5, a serial to parallel converter circuit 502 receives the data 428 and bit clock 426 signals from the clock extract phase locked loop circuit 406 (FIG. 4). After converting the data to parallel, the serial to parallel converter 502 sends this data over an eight-bit bus 512 to a D-flop latch 504 which latches the data prior to it being sent over another eight-bit bus 444 to the eight-bit FIFO 416 (FIG. 4). The D_OE signal 434 from the controller 410 (FIG. 4) gates the data from the D-flop latch 504 onto the bus 444.

Data 428 and bit clock 426 are also connected to a start delimiter detector 506. When the start delimiter detector 506 receives the carrier sense signal 424, its starts examining the data 428 until it recognizes the start delimiter byte pattern 306 (FIG. 3). When the start delimiter pattern is detected, the start delimiter detector 506 sends the SD REC signal 514 to a byte divider circuit 508. After receiving the SD REC signal 514, the byte divider circuit 508 divides the bit clock 426 by eight to create a byte clock signal 516 which is sent to a source address counter circuit 510. The byte clock signal 516, because it is gated by SD REC 514 and carrier sense 424 synchronizes the bytes within the information frame. The source address counter circuit 510 will ignore the first six byte clock 516 signals since they clock bytes for the destination address, and will pass the next six byte clock signals 516 to become the source address clock 430. The source address clock 430 is connected to the D-flop latch 504 to latch the eight parallel bits on signal 512. The SA clock signal 430 also is sent to the controller 410 which uses the signal to activate the D_OE 434 and store the parallel bits into the FIFO 416 (FIG. 4). After the SA clock signal has activated six times, once for each of the source address bytes, the end signal 432 will be activated and sent to the controller 410. In the manner described above, the circuit of FIG. 5 will select the six source address bytes from the incoming information frame, convert them to parallel data, and send each of the six bytes over the eight-bit parallel bus 444.

Figure 6:
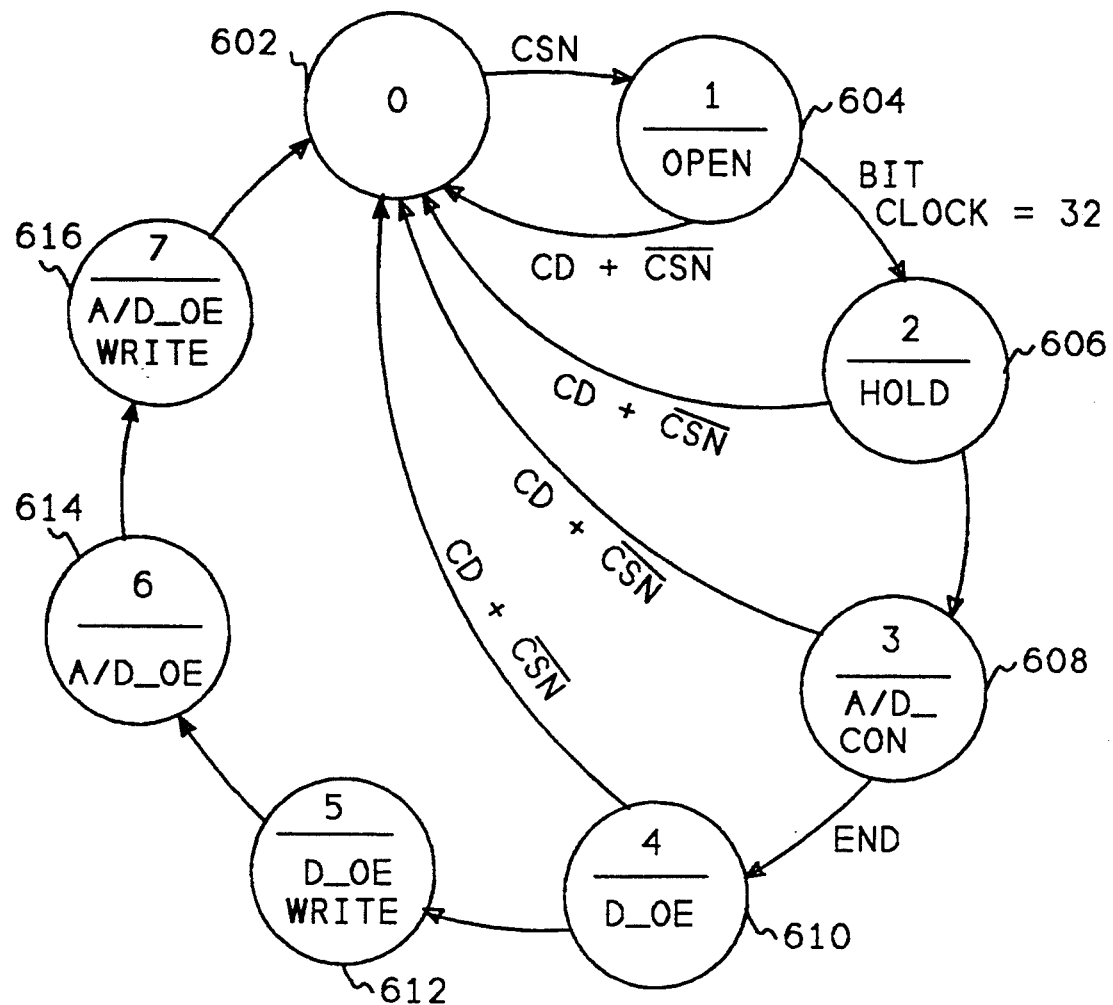
FIG. 6 shows a state diagram of the controller circuit of FIG. 4.

FIG. 6 shows a state diagram of the controller circuit 410 of FIG. 4. This state diagram will be described in conjunction with the block diagram FIG. 4. Referring now to FIGS. 6 and 4, the controller starts in state Zero 602. When the carrier sense (CSN) signal 424 is received, the controller goes to state One 604 and sends the open signal 436 to the sample and hold circuit 408. This causes the sample and hold circuit 408 to start sampling the output of the five megahertz filter and amplifier 404. After thirty-two bit clocks, the controller goes to state Two 606, drops the open signal 436 and asserts the hold signal 438 to the sample and hold circuit 408 which causes it to hold the value accumulated for the analog level of the network signal. After sending the hold signal, the controller goes to state Three 608, drops the hold signal and asserts the A/D CONV signal 442 to cause the analog-to-digital converter circuit 414 to convert the output of sample and hold circuit 408 into a digital value.

If a collision is detected, or carrier drops, the controller goes back to state Zero, since the frame will be incomplete and no information can be accumulated from it. Otherwise, the controller goes to state Four 610 to start the process of storing the source address into the FIFO 416. State Four 610 waits for the SA clock signal and then goes to state Five 612 which asserts the D_OE signal 434 and the write signal 450 to write the source address into the FIFO 416. After all six bytes have been written into the FIFO 416, the controller goes to state Six 614. State Six 614 sends the A/D_OE signal 440 to the analog-to-digital converter 414 to cause it to gate the parallel converted output signal to the FIFO 416. The controller then goes to state Seven 616 which maintains the A/D_OE signal 440 and also asserts the write signal 450 to write the digital value into the FIFO 416. The controller then goes back state Zero 602 to wait for the next information frame.

Figure 7:
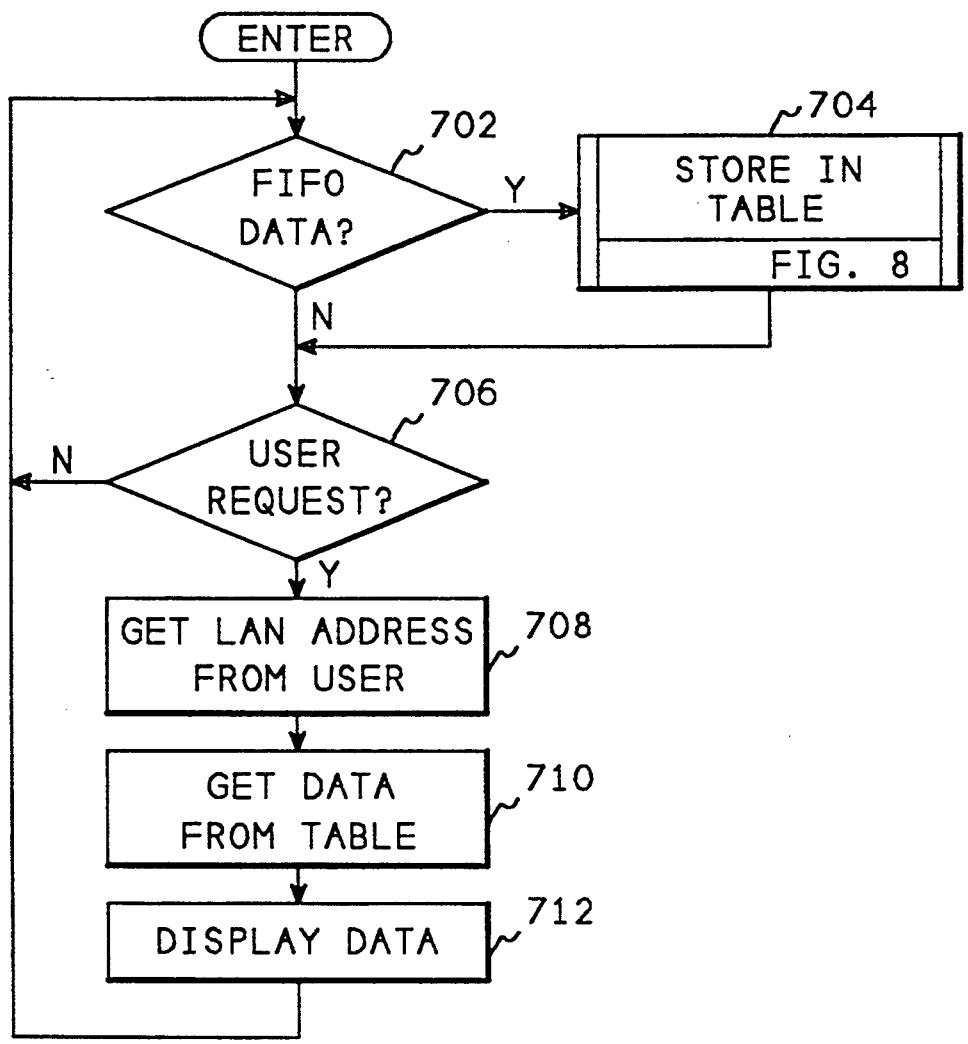
FIG. 7 shows a flowchart of the top level of the software of the LAN level monitor of the invention.
Figure 8:
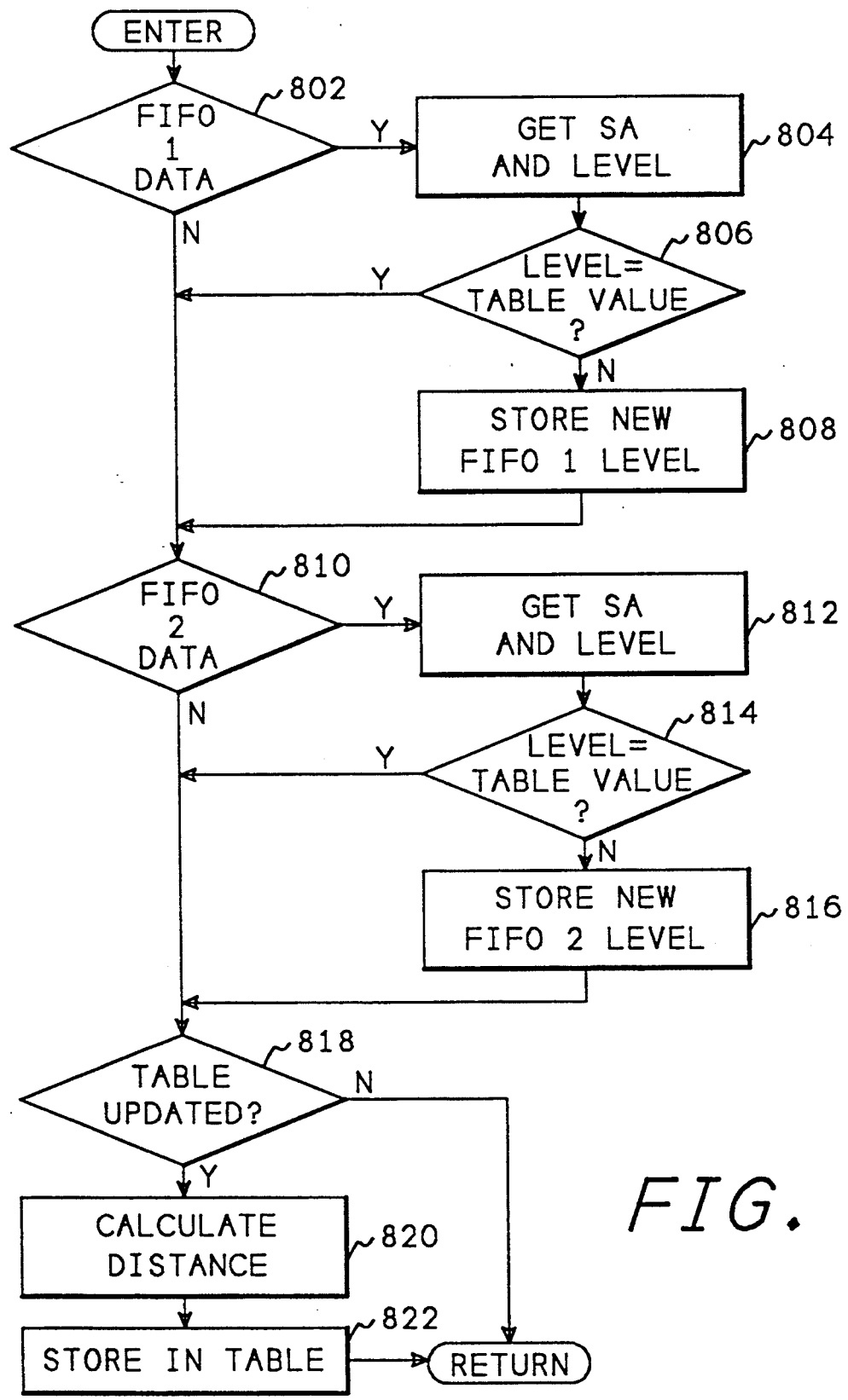
FIG. 8 shows a flowchart of the store table function of the software of the LAN level monitor of the invention.

FIG. 7 shows a flowchart of the top level of the software of the invention which is part of the data correlation software 120 (FIG. 1). The purpose of the software described in FIGS. 7 and 8 is to correlate the data collected in the FIFOs in the two LAN monitors of the system. The software collects the digital values for the transmission levels measured at each LAN monitor for each information frame, and using these levels it computes the location of the node that sent the information frame.

Referring now to FIG. 7, after entry, block 702 determines whether any FIFO data is available in the FIFOs of either of the LAN monitors. If data is available, block 702 transfers to block 704 which calls FIG. 8 to store the data into a table. After storing the FIFO data in the table, or if no FIFO data was available, control goes to block 706 which determines whether a user request has been input. If a user request has been input, block 706 transfers to block 708 which gets the LAN address from the user. Block 710 then gets the location of that node from the table and block 712 displays the location to the user before returning to block 702.

FIG. 8 is a flowchart of the store table function of the software. Referring now FIG. 8, after entry, block 802 determines whether there is data available in the first LAN monitor FIFO. If data is available in the first LAN monitor FIFO, block 802 transfers to block 804 which reads the source address and the signal level from the first FIFO, and determines whether the signal level read is equal to the value already stored in the table for that source address. If the value is the same as that already stored in the table, no new table entry is made, and block 806 transfers to block 810. The table entry contains the node address and the signal levels from both FIFOs. If the level obtained from the FIFO is different from the level stored in the table, block 806 transfers to block 808 which stores the new level in the table before transferring to block 810. Block 810 determines whether the FIFO in the second LAN monitor has data. If this FIFO has data, block 810 transfers to block 812 which gets the source address and level values from the FIFO. Block 814 then determines whether the level already stored in the table is the same as the level lust read from the FIFO. If the levels are the same, block 814 transfers to block 818 since the table does not need to be updated. If the levels are different block 814 transfers to block 816 which stores the new level value from the FIFO in the second LAN monitor into the table. Block 818 then determines whether the table was updated by one of the above processes. If the table has been updated, a new location needs to calculated, so block 818 transfers to block 820. Block 820 calculates the distance from the center of the cable to the node, using the following formula:

$$\text{Distance} = \frac{10 \text{ LOG (Level 1/Level 2)}}{\text{Loss in dB per foot}}$$

If the Distance value is positive, the node is in a direction toward the first LAN monitor from the center, and if Distance is negative, the node is in a direction toward the second LAN monitor from the center. Thin LAN cable has a loss of 0.0098 dB per and thick LAN cable has a loss of 0.0033 dB per foot. After computing the distance, block 822 stores this value into the table before returning to FIG. 7.

The following are examples of computing this distance for thin LAN cable:

Example 1:
Level 1 = 0.7980, Level 2 = 0.6368
Distance = ((10 * LOG (0.7980/0.6368)))/.0098
        = 100

Therefore the node is located 100 feet from the center of the cable, on the side of the cable nearest LAN monitor 1.

Example 2:
Level 1 = .35, Level 2 = .99
Distance = ((10 * LOG (0.35/0.99))/.0098)
        = −461

Therefore, the node is 461 feet away from the center of the cable, and on the side of the cable opposite LAN monitor 1. Also, since the Level 2 value is approximately one, which is the required transmitted voltage level, the node is located approximately coincident with LAN monitor two, therefore, the length of the cable is approximately 922 feet.

Steps could be inserted between blocks 804 and 806, as well as between blocks 812 and 814, to compare the level to a threshold value. This threshold value would be the minimum level that the node is required to send, and if the signal level was below the minimum, an error message would be displayed.

Figure 9A:
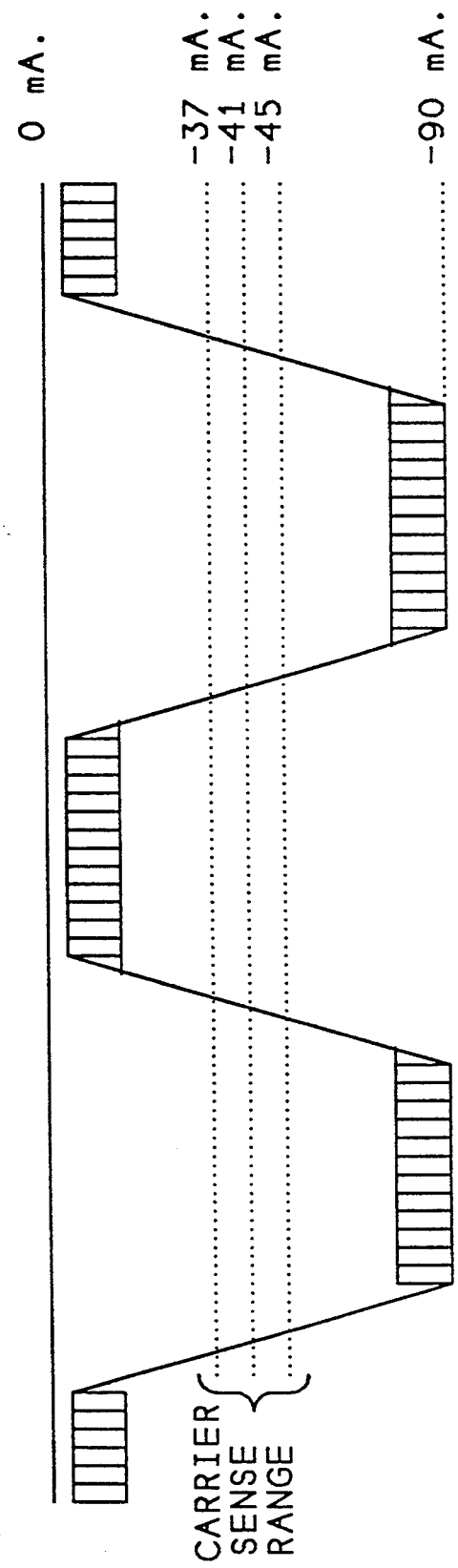
FIG. 9A shows a diagram of the signal levels for the carrier of the pseudo frame transmitted by the LAN collision trap circuit of the invention.

FIG. 9A shows a diagram of the signal levels as defined in the IEEE 802.3 specification. Referring now to FIG. 9A, and also referring back to FIG. 2, the carrier sense threshold setting for each MAU (maximum) should be −0.9158 volts, which is −37 milliamps (minimum average current for a single MAU) multiplied by the minimum resistance of 24.775 ohms (based on a LAN having a minimum length of 2 meters and having terminations of 49.5 ohms).

Figure 9B:
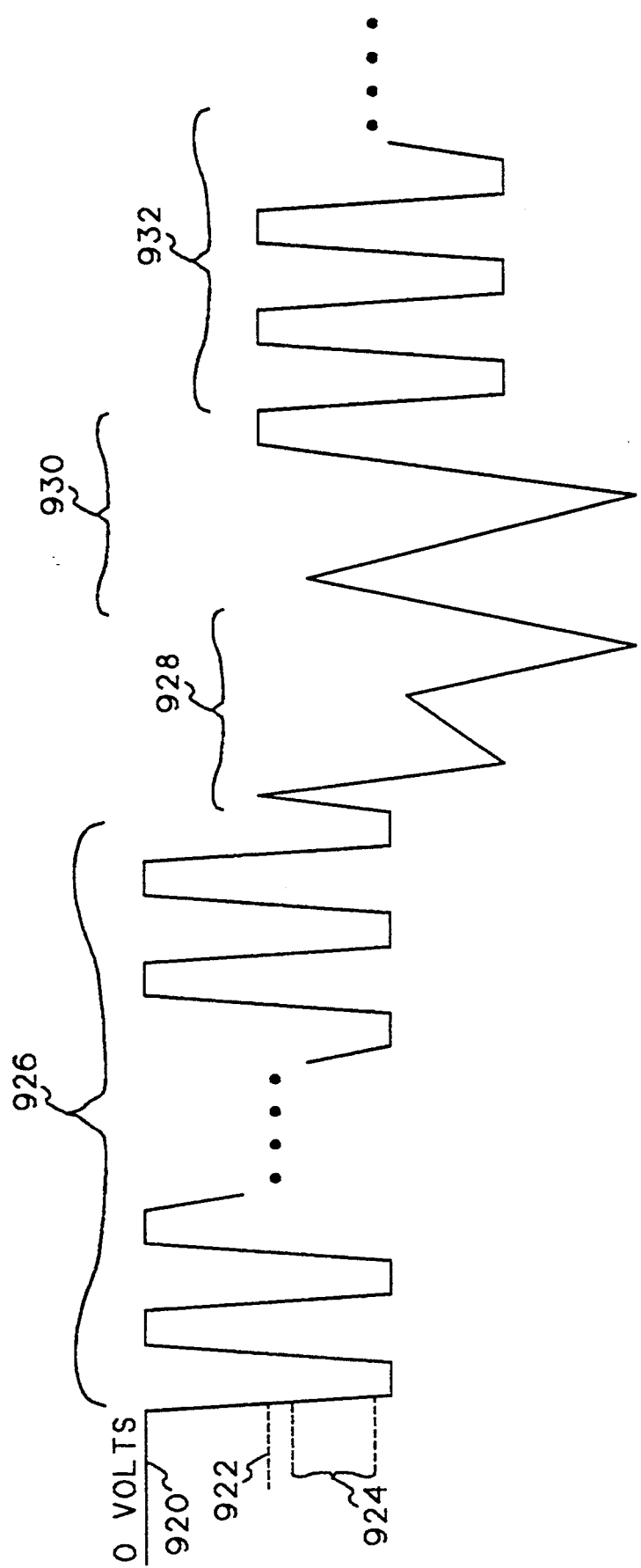
FIG. 9B shows a diagram of the signal levels for the pseudo frame signal of the present invention.

FIG. 9B shows a diagram of the signals of the pseudo frame. Referring now to FIG. 9B, the LAN collision monitor, as will be described below, uses a current mode digital-to-analog converter to transmit the pseudo frame on the network. The network reference 920 is zero volts. The pseudo frame signal 926 has a nominal average DC voltage, illustrated at reference 922, of −1.025 volts. The collision detection average DC voltage range 924 is −1.492 volts to −1.629 volts. The pseudo frame signal 926 is a continuous data pattern of 10101010 ... and its DC average current varies between the minimum value of −37 milliamps and the maximum value of −45 milliamps, as defined by IEEE Standard 802.3. This tests the carrier sense thresholds of all the MAUs on the network.

During the pseudo frame 926, a collision signal is indicated by reference 928. When a collision 928 is detected by the present invention, the pseudo frame signal 926 is changed to a constant DC current of −41 milliamps, which is the average DC current of the pseudo frame signal 926. This allows the colliding node's AC signal amplitude 932 to be captured.

The voltages shown in FIG. 9B are for nominal drive currents of single MAUs transmitting into 25 ohms.

Figure 10A:
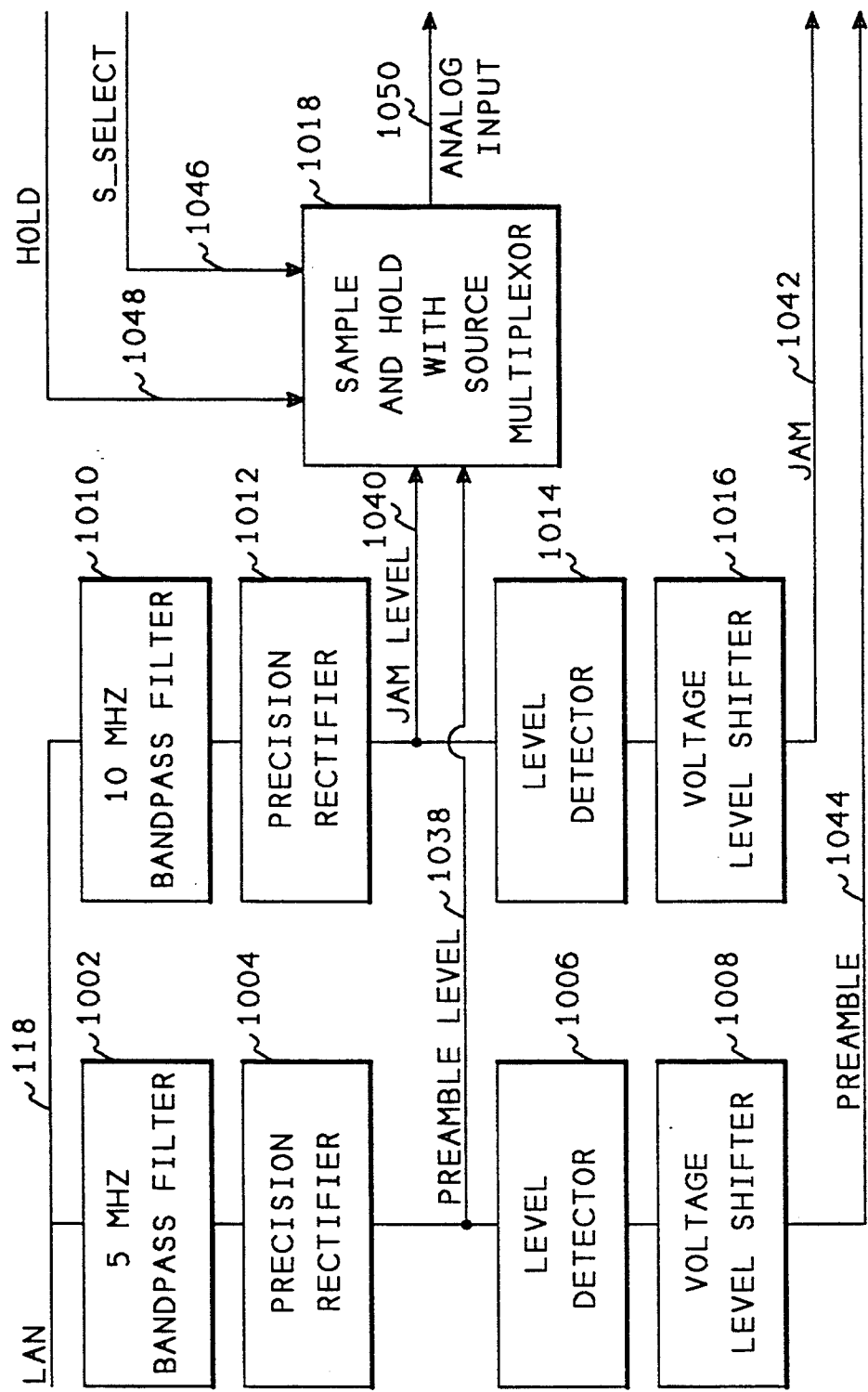
FIGS. 10A and 10B show a block diagram of the LAN collision trap circuit of the present invention.
Figure 10B:
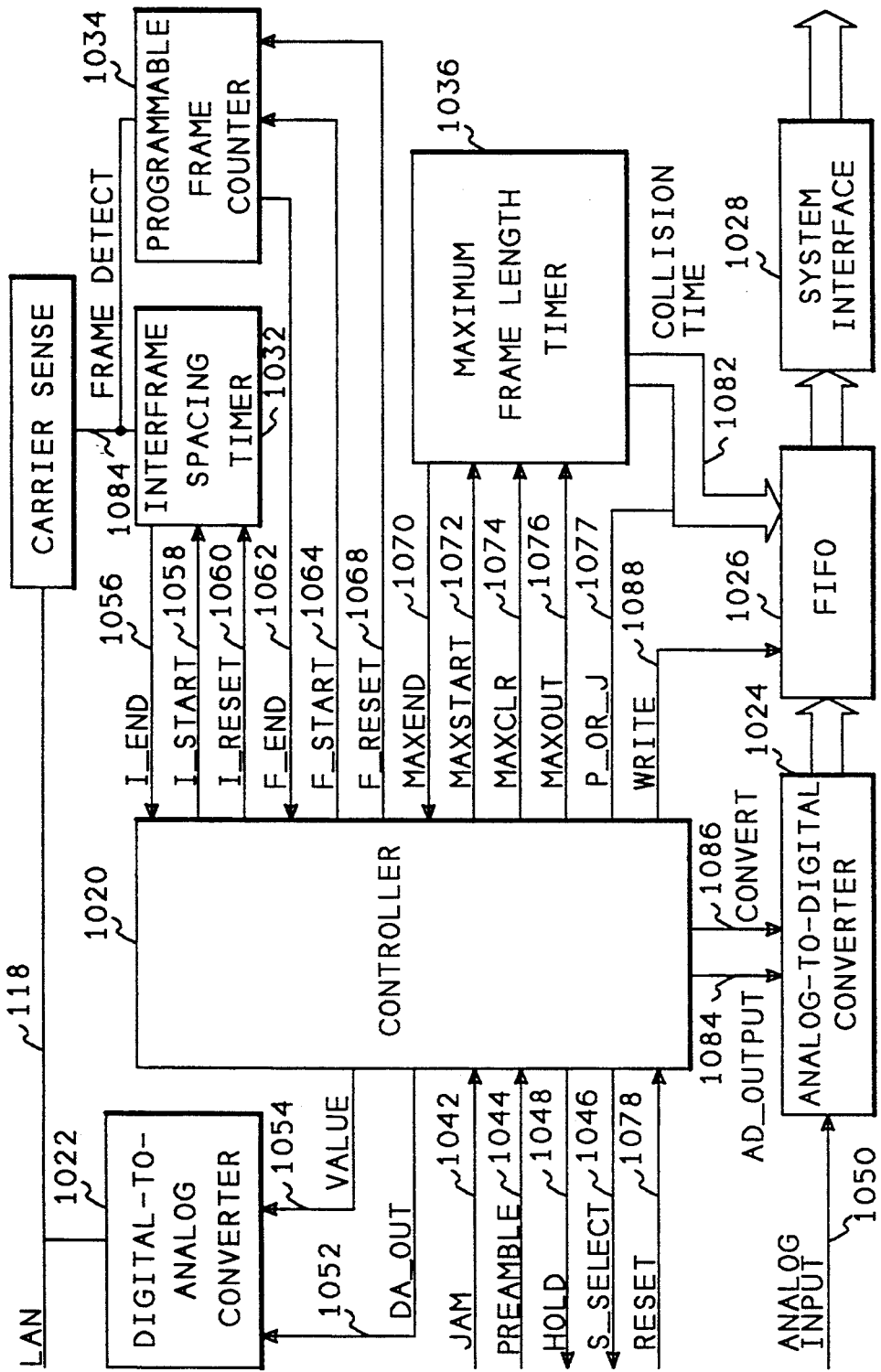

FIGS. 10A and 10B show a block diagram of the LAN collision trap 130 of FIG. 1. Referring now to FIGS. 10A and 10B, a 5 megahertz bandpass filter 1002 receives the signals from the local area network 118 and sends an output to a precision rectifier 1004. The output of the precision rectifier 1004 is a preamble voltage level signal 1038 which is connected to a level detector 1006 and also to a first input of a sample and hold with source multiplexer circuit 1018. The output of the level detector 1006 goes to a voltage level shifter 1008 and becomes a PREAMBLE logic signal 1044 which is input to the controller 1020.

Also connected to the LAN 118 is a 10 megahertz bandpass filter 1010 which is connected to a second precision rectifier 1012. The output of the precision rectifier 1012 is the jam voltage level signal 1040 which is connected to a level detector 1014 and also to a second input of the sample and hold with source multiplexer circuit 1018. The output of the level detector 1014 is connected to a voltage level shifter 1016 whose output is the JAM logic signal 1042 which is connected to the controller 1020.

The controller 1020 outputs a DA_OUT signal 1052 and a VALUE signal 1054 to a digital-to-analog converter 1022. The output of the digital-to-analog converter 1022 is connected to the LAN 118.

Also connected to the LAN 118 is a carrier sense circuit 1030 whose output is a FRAME DETECT signal 1084 which connected to an interframe spacing timer 1032 and a programmable frame counter 1034. The interframe spacing timer 1032 sends an I_END signal 1056 to the controller 1020. The controller 1020 sends an I_START signal 1058 and an I_RESET signal 1060 to the interframe spacing timer 1032. The programmable frame counter 1034 sends an F_END signal 1062 to the controller 1020 and the controller 1020 sends an F_START signal 1064 and an F_RESET signal 1068 to the programmable frame counter 1034.

A maximum frame length timer circuit 1036 sends a MAXEND signal 1070 to the controller 1020. The controller 1020 sends a MAXSTART signal 1072, a MAXCLR signal 1074, and a MAXOUT signal 1076 to the maximum frame length timer 1036. The maximum frame length counter 1036 also sends an eleven-bit parallel output COLLISION TIME signal 1082 to a FIFO 1026. The controller outputs the signal $P_{13}$ OR_J 1077, which defines whether a collision or a jam was detected, as bit eleven onto bus 1082 for storage in the FIFO 1026.

The controller 1020 sends a HOLD signal 1048 and an S_SELECT signal 1046 to the sample and hold with source multiplexer circuit 1018 in order to select one of its inputs and to send its output 1050 to an A/D converter circuit 1024. The output 1080 of the A/D converter is connected to the FIFO 1026. The output of the FIFO 1026 is gated through an interface 1028 onto the system bus 104 (FIG. 1). A RESET signal 1078 is received from the system bus 104.

Figure 11:
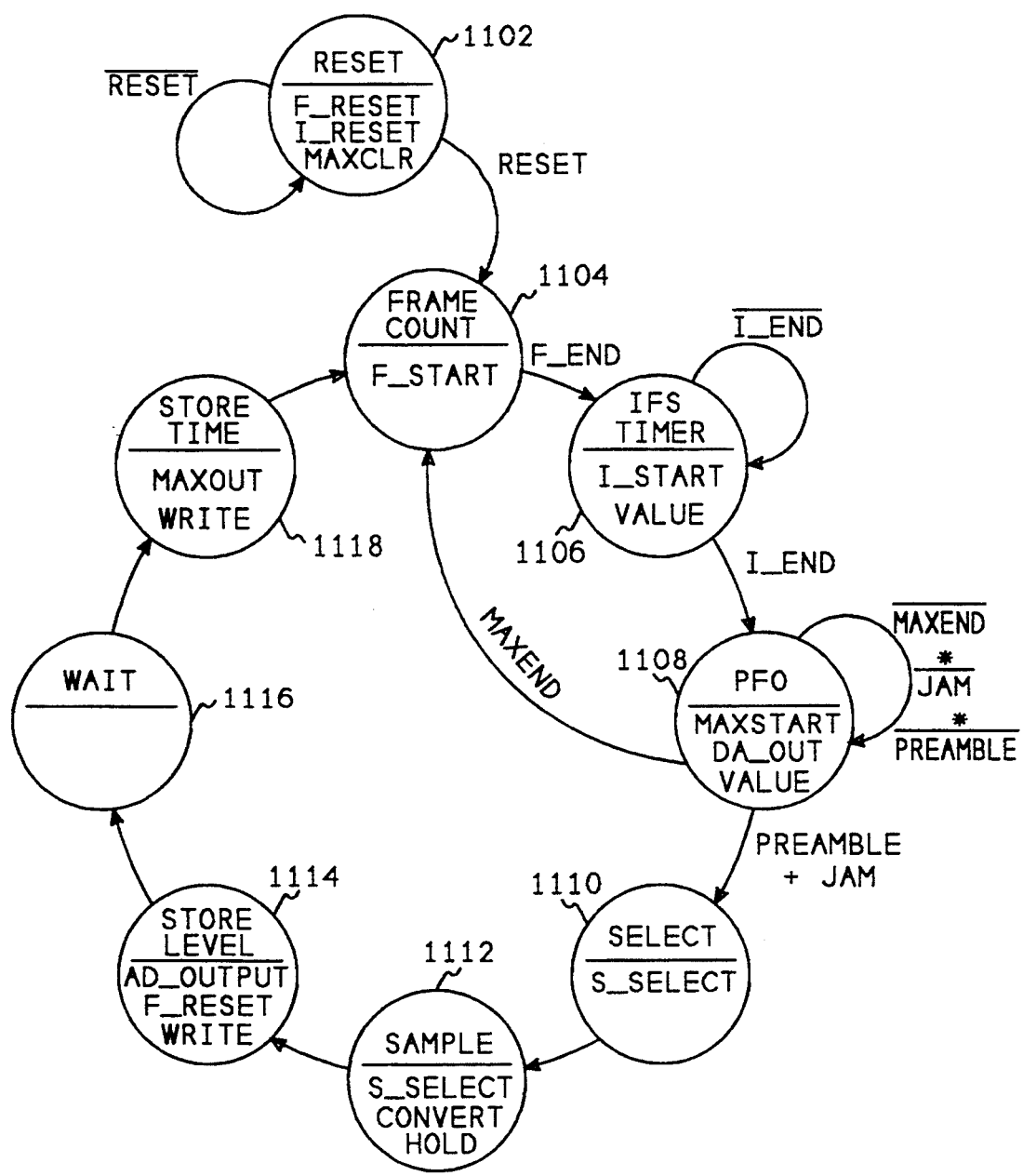
FIG. 11 shows a state diagram of the controller of the LAN collision trap.

The operation of the circuit FIGS. 10A and 10B will be better explained in conjunction with the state diagram of FIG. 11.

FIG. 11 shows a state diagram of the operation of the controller 1020 of FIG. 10B. Referring now to FIG. 11, the controller starts in RESET state 1102 and remains there until the RESET signal 1078 goes high on the system bus 104. While in the RESET state, the controller 1020 sends the F_RESET signal 1068 to the programmable frame counter 1034. Also while in RESET state, the controller 1020 sends the I_RESET signal 1060 to the interframe spacing timer 1032, and it sends the MAXCLR signal 1074 to the maximum frame length timer 1036.

After receiving the RESET signal 1078, the controller goes to the FRAME COUNT state 1104. While in the FRAME COUNT state, the controller sends the F_START signal 1064 to the programmable frame counter 1034. The programmable frame counter is a counter set up to insure that the LAN collision trap circuit does not take too much of the resources available on the local area network. This counter will be given a value, typically 1000, and it will count this value down to zero, one count per frame detected on the local area network. As shown in FIG. 10B, the FRAME DETECT signal 1084 is an input to the programmable frame counter, and it causes the counter to count down once for each frame on the local area network 118. Thus, if the programmable frame counter is set 1000, the LAN collision trap will only send a pseudo frame after every 1000 frames sent by other nodes on the network.

When the programmable frame counter 1034 counts to zero, it sends the F_END signal 1062 to the controller 1020. Upon receiving the F_END signal 1062, the controller state goes from the FRAME COUNT 1104 state to the IFS TIMER state 1106. In the IFS TIMER state 1106, the controller sends the I_START signal 1058 to the interframe spacing timer 1032. The interframe spacing timer is designed to cause the LAN collision trap circuit to wait the proper amount of time between the last frame and the start of its pseudo frame. That is, the IEEE 802.3 interface specification requires a minimum amount of time between frames, and the LAN collision trap circuit must honor this specification. When the interframe spacing timer has counted down to zero, it sends the I_END signal 1056 to the controller 1020. Upon receiving the I_END signal, the controller goes from the IFS TIMER state 1106 to the PFO state 1108.

In the PFO state 1108, the LAN collision trap circuit outputs the pseudo frame onto the network 118. While in the PFO state 1108, the controller sends the DA_OUT signal 1052 to the digital-to-analog converter circuit 1022, and it also sends the VALUE signal 1058 giving the digital-to-analog converter the proper value for the pseudo frame output onto the network 118. Upon receiving these two signals, the digital-to-analog converter circuit 1022 converts the value into an analog value and places it on the network 118. In the PFO state 1108, the controller 1020 also sends the MAXSTART signal 1072 to the maximum frame length timer 1036. This signal causes the maximum frame length timer 1036 to start timing the maximum length for a frame. Using this timer, the LAN collision trap circuit 130 can send the maximum allowable length frame onto the network 118.

The controller will remain in the PFO state 1108 until one of three events occurs. One of these events could be the receipt of the MAXEND signal 1076 indicating that the pseudo frame has reached its maximum length, at which point the controller will go from the PFO state 1108 back to the FRAME COUNT state 1104 indicating that none of the nodes on the network have caused an error during this pseudo frame. If either a PREAMBLE signal 1044 or a JAM signal 1042 is received by the controller 1020, the controller will go from the PFO state 1108 to the SELECT state 1110. This transition indicates that either a preamble from a collision signal has been received, or a JAM signal has been received. In either case, the LAN collision trap circuit must identify the node.

While in the SELECT state 1110, the controller 1020 sends the S_SELECT signal 1046 to the sample and hold with source multiplexer circuit 1018. This signal selects whether the sample and hold with source multiplexer circuit will hold the PREAMBLE signal 1038 or the JAM signal 1040.

The controller then goes to the SAMPLE state 1112 where it sends the CONVERT signal 1086 to the A/D converter circuit 1024 and the HOLD signal 1048 to the sample and hold circuit, while maintaining the S_SELECT signal 1046. The controller then goes to the STORE LEVEL state 1114 where it sends the F_RESET signal 1068 to reset the programmable frame counter. It sends the AD_OUTPUT signal 1084 to the A/D converter circuit 1024 to cause it to send its converted output onto bus 1080 to the FIFO circuit 1026. The controller 1020 then sends the WRITE signal 1088 to the FIFO 1026 to cause it to write the value of the A/D converter output 1080 into the FIFO. The controller then goes to the WAIT state 1116 to allow the FIFO 1026 time to write the data. The controller then goes to the STORE TIME state 1118 and sends the MAXOUT signal 1076 to the maximum frame length timer 1036 to cause it to output the COLLISION TIME value (relative to the beginning of the pseudo-frame) onto the bus 1082. The controller also sends the P_OR_J signal 1077 to the bus 1082. The controller 1020 also sends the WRITE signal 1088 to cause the FIFO 1026 to write the count value and the P_OR_J signal into the FIFO. The controller then returns to the FRAME COUNT state 1104 to await the next time in which it can send a pseudo frame onto the local area network.

Figure 12:
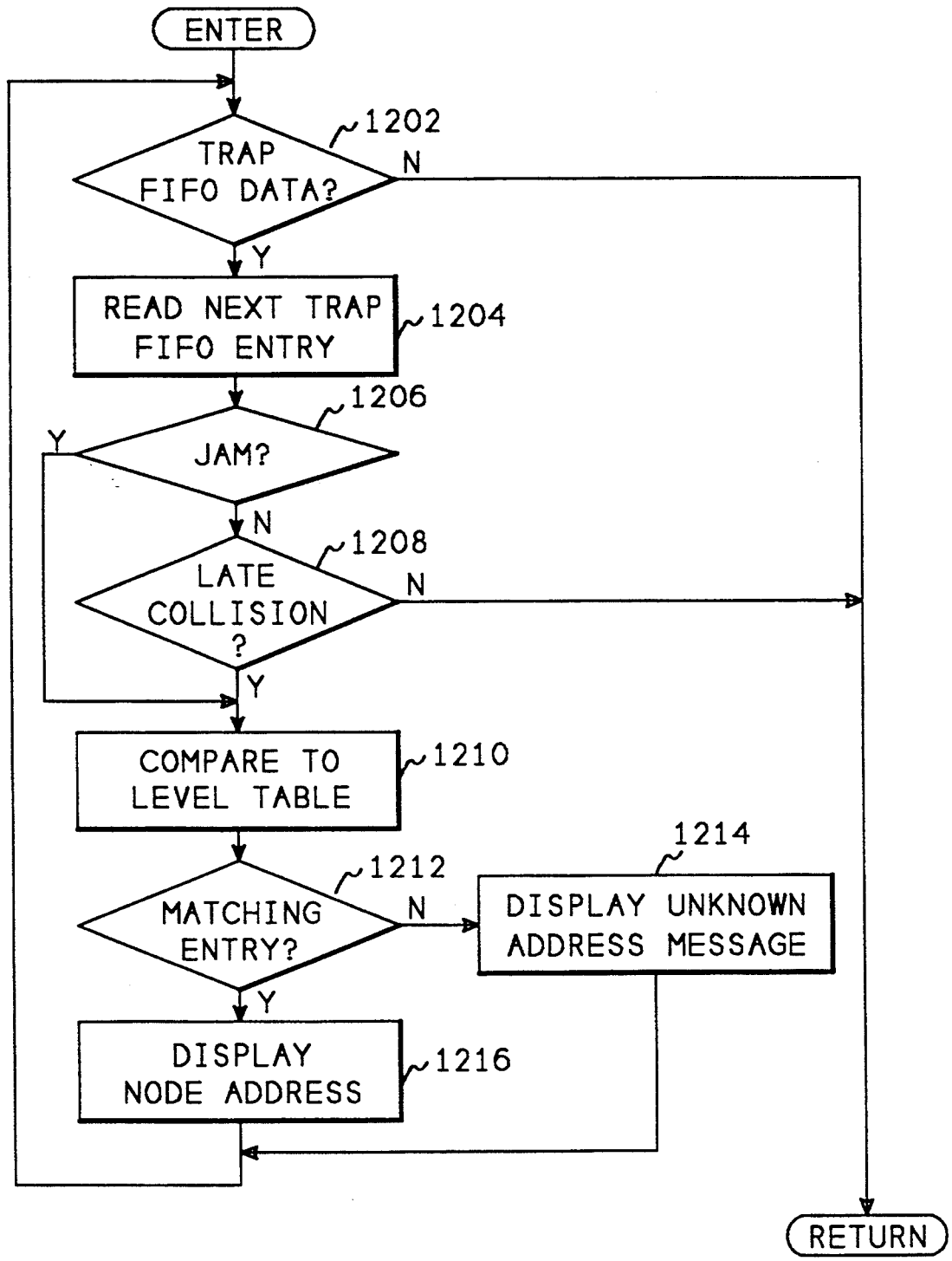
FIG. 12 shows a flowchart of the software that determines late collisions.

FIG. 12 shows a flowchart of the part of the correlation software 120 (FIG. 1) that correlates the signal levels of the collision transmission to the levels detected by the LAN level monitors in order to determine the address of the node causing the collision. Referring now to FIG. 12, after entry, block 1202 determines whether any collision or jam data is in the FIFO 1026. If no collision data or no additional collision data is stored in the FIFO, block 1202 returns to the caller. If data is stored in the FIFO, block 1202 goes to block 1204 which reads the next set of data from the FIFO 1026. Block 1206 then determines if the data represents a jam signal, and if so, transfers to block 1210. If the data is not for a jam, block 1206 goes to block 1208 which determines, based on the time of the collision, whether the collision was a late collision. If the collision was not late, block 1208 returns to the caller, otherwise it transfers to block 1210 to determine the address and location of the node that caused the late collision. Block 1210 then compares the LAN collision trap data to the data in the tables collected by FIG. 9. The level detected by the LAN collision trap circuit of FIGS. 10A and 10B is compared to the level collected by the LAN level monitors of FIGS. 5 and 6. The match is performed to within a tolerance level, since a slight variation in the signal levels would not indicate a different node. If a match occurs to within the tolerance, block 1212 transfers to block 1216 which displays the node address of the two nodes involved in the collision. If there is no match, block 1212 transfers to block 1214 which displays message indicating that the nodes are not yet known.

Whether a collision is a valid early collision or an invalid late collision is determined by comparing the time of the collision to the start of the pseudo frame. A maximum configured 802.3 LAN consists of a maximum of five 185 meter segments (using thin LAN cable) connected by four repeaters. The ANSI/IEEE 802.3a-1988 specification defines that a 185 meter LAN segment (using thin LAN cable) must have a propagation delay of less than 9.5 bit times (where one bit time is 100 nanoseconds) and a repeater must, have a delay of less than 7.5 bit times, so the maximum delay from one extreme end of a maximum configured LAN cable to the other extreme end is 77.5 bit times. Therefore, a legal collision can only occur during the first 7.75 microseconds of a frame. The maximum length frame is 1518 bytes or 12,144 bit times, which is 1.214 milliseconds. Any collision that occurs during the last 1.206 milliseconds of a pseudo frame is a late collision.

Because the jam signal detected by FIGS. 10A and 10B is a ten megahertz signal, the level value will be slightly different from the levels collected by the LAN levels monitors. This difference is caused by the different attenuation through the cable of a ten megahertz signal versus the attenuation that occurs on the five megahertz preamble signal. Therefore, block 1210 must first adjust the level values from the FIFO 1026 for the jam signal, in order to compensate for the different loss, before performing the comparison.

The information received from the LAN Collision Trap concerning valid early collisions could be used to analyze the back-off timing of each of the nodes on a LAN to pinpoint abnormalities, such as nodes with identical timing or back-off timings that are too short, etc.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A system for determining defective nodes on a computer network cable, said system comprising:

a signal level determining means, connected on said cable, for determining and storing a signal level of each signal sent in said cable, whereby said signal level indicates which of a plurality of nodes sent said signal;

means for sending a pseudo frame signal on said cable;

a signal detecting means for detecting a late collision signal, while said means for sending a pseudo frame is sending a pseudo frame on said cable, and for determining a collision signal level of said late collision signal, wherein said late collision signal comprises a collision signal sent in said cable after a predetermined amount of time beyond a start of each signal;

calculating means connected to said signal level means and said signal detecting means for comparing said collision signal level to each of said stored signal levels to determine a location of a node sending said late collision signal, wherein said node sending said late collision signal is a defective node.

2. The system of claim 1 further comprising display means for displaying said location of said defective node.

3. The system of claim wherein said signal detecting means for detecting said late collision signal comprises:
    means for detecting a start of a second signal on said cable;
    means for determining a time of occurrence of said start of said second signal; and
    means for comparing said time of occurrence with a predetermined time threshold and for indicating said late collision if said time of occurrence is later than said predetermined time threshold.

4. The system of claim 1 wherein said signal detecting means further comprises means for detecting an invalid jam signal that occurs while said means for sending a pseudo frame is sending said pseudo frame.

5. The system of claim 6 wherein said means for detecting an invalid jam signal comprises:
    means for detecting a jam signal on said cable;
    means for determining a time of occurrence of said jam signal;
    means for comparing said time of occurrence of said jam signal to an end of said pseudo frame and for indicating an invalid jam if said time of occurrence of said jam signal occurs before an end of said pseudo frame.

6. The method of claim 1 wherein said pseudo frame signal comprises an alternating data pattern of binary one and binary zero.

7. A system for determining defective modes on a computer network cable, said system comprising:
    a signal level determining means, connected on said cable, for determining and storing a signal level of each signal sent in said cable;
    means for sending a pseudo frame signal on said cable;
    a signal detecting means for detecting an invalid jam signal, while said means for sending a pseudo frame in sending a pseudo frame on said cable, and for determining an invalid jam signal level of said invalid jam signal; and
    calculating means connected to said signal level determining means and said signal detecting means for comparing said invalid jam signal level to each of said stored signal levels to determine to location of a node sending said invalid jam signal, wherein said node sending said invalid jam signal is a defective node.

8. The system of claim 7, further comprising display means for displaying said location of said defective node.

9. The system of claim 7 wherein said signal detecting means further comprises means for detecting a late collision signal that occurs while said pseudo frame is being sent, wherein said late collision signal comprises a collision signal sent in said cable after a predetermined amount of the time beyond a start of each signal.

10. The system of claim 9 wherein said means for detecting said late collision signal comprises:
    means for detecting a start of a second signal on said cable;
    means for determining a time of occurrence of said start of said second signal; and
    means for comparing said time of occurrence with a predetermined time threshold and for indicating said late collision if said time of occurrence is later than said predetermined time threshold.

11. The system of claim 7 wherein said means for detecting said invalid jam signal comprises:
    means for detecting a jam signal on said cable;
    means for determining a beginning time of said jam signal;
    means for comparing said beginning time of said jam signal to an end of said pseudo frame and for indicating said invalid jam signal if said beginning time of said jam signal occurs before an end of said pseudo frame.

12. A method of claim 7 wherein said pseudo frame signal comprises an alternating data pattern of binary one and binary zero.

13. A method for determining defective nodes on a computer network cable, said method comprising the steps of:
    (a) determining and storing a signal level for each signal sent in said cable, whereby said signal level indicates a location of a node sending said signal;
    (b) sending a pseudo frame on said cable;
    (c) detecting an invalid jam signal sent in said cable while said pseudo frame in being sent;
    (d) determining a jam signal level of said invalid jam signal;
    (e) comparing said jam signal level to each of said stored signal levels to determine a location of a node sending said invalid jam signal, wherein said node sending said invalid jam signal is a defective node;
    (f) detecting a late collision signal in said cable while said pseudo frame is being sent, wherein said late collision signal comprises a collision signal sent in said cable after a predetermined amount of time beyond a start of each signal;
    (g) determining a late collision signal level of said late collision signal;
    (h) comparing said late collision signal level to each of said stored signal levels to determine a location of a node sending said late collision signal, wherein said node sending said late collision signal is a defective node.

14. The method of claim 13 further comprising the step of:
    (i) displaying said location of any defective nodes.

15. The method of claim 13 wherein step (f) further comprises the steps of:
    (f1) detecting a start of a second signal on said cable;
    (f2) determining a time of occurrence of said start of said second signal; and
    (f3) comparing said time of occurrence with a predetermined time threshold and for indicating said late collision if said time of occurrence is later than said predetermined time threshold.

16. The system of claim 13 wherein step (c) further comprises the steps of: (c1) detecting a jam signal on said cable; (c2) determining a time of occurrence of a beginning of said jam signal; (c3) comparing said time of occurrence of said beginning of said jam signal to an end of said pseudo frame and indicating said invalid jam if said jam signal occurs before an end of said pseudo frame.

17. The method of claim 13 wherein said pseudo frame signal sent in step (b) comprises an alternating data pattern of binary one and binary zero.

* * * * *